United States Patent
Zhang et al.

(10) Patent No.: US 7,773,521 B2
(45) Date of Patent: Aug. 10, 2010

(54) STORAGE SWITCH TRAFFIC BANDWIDTH CONTROL

(75) Inventors: Chao Zhang, Milpitas, CA (US);
Robert Tower Frey, Milpitas, CA (US)

(73) Assignee: EMC Corporation, Hopkinton, MA (US)

( * ) Notice: Subject to any disclaimer, the term of this patent is extended or adjusted under 35 U.S.C. 154(b) by 1867 days.

(21) Appl. No.: 10/836,133

(22) Filed: Apr. 30, 2004

(65) Prior Publication Data
US 2006/0098572 A1    May 11, 2006

(51) Int. Cl.
*H04J 1/16* (2006.01)
(52) U.S. Cl. .................. 370/235; 370/229
(58) Field of Classification Search ......... 370/229–235; 709/208–217
See application file for complete search history.

(56) References Cited

U.S. PATENT DOCUMENTS

| | | | |
|---|---|---|---|
| 6,304,552 B1 * | 10/2001 | Chapman et al. | 370/232 |
| 6,614,757 B1 * | 9/2003 | Rochberger et al. | 370/231 |
| 6,738,350 B1 * | 5/2004 | Gao et al. | 370/232 |
| 6,832,255 B1 * | 12/2004 | Rumsewicz et al. | 709/227 |

* cited by examiner

*Primary Examiner*—Phuc Tran
(74) *Attorney, Agent, or Firm*—Barry N. Young

(57) ABSTRACT

A switch including a processor and method for monitoring bandwidth in the storage switch. The switch includes at least one physical port coupling at least one target and at least one initiator via the physical port. The monitoring method may include the steps of determining whether congestion occurs on the physical port and assigning a weight to bandwidth usage between the initiator and the target based on a minimum and maximum bandwidth settings for each target. The switch may further include a step of controlling bandwidth usage by each of said at least two targets based on minimum and maximum bandwidth settings for each of the targets.

24 Claims, 9 Drawing Sheets

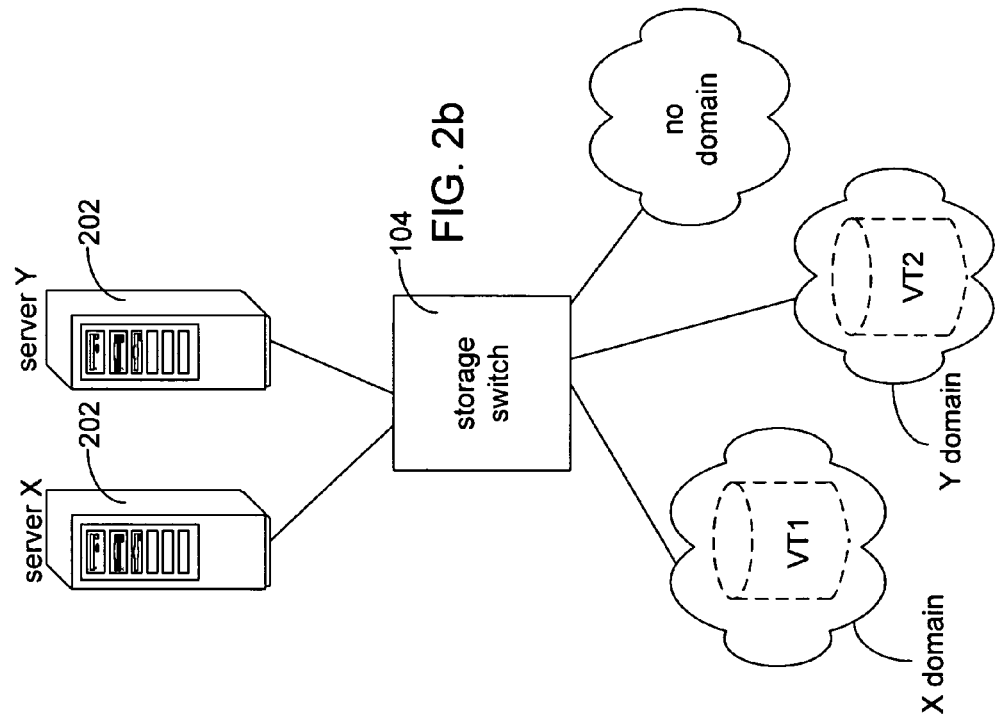
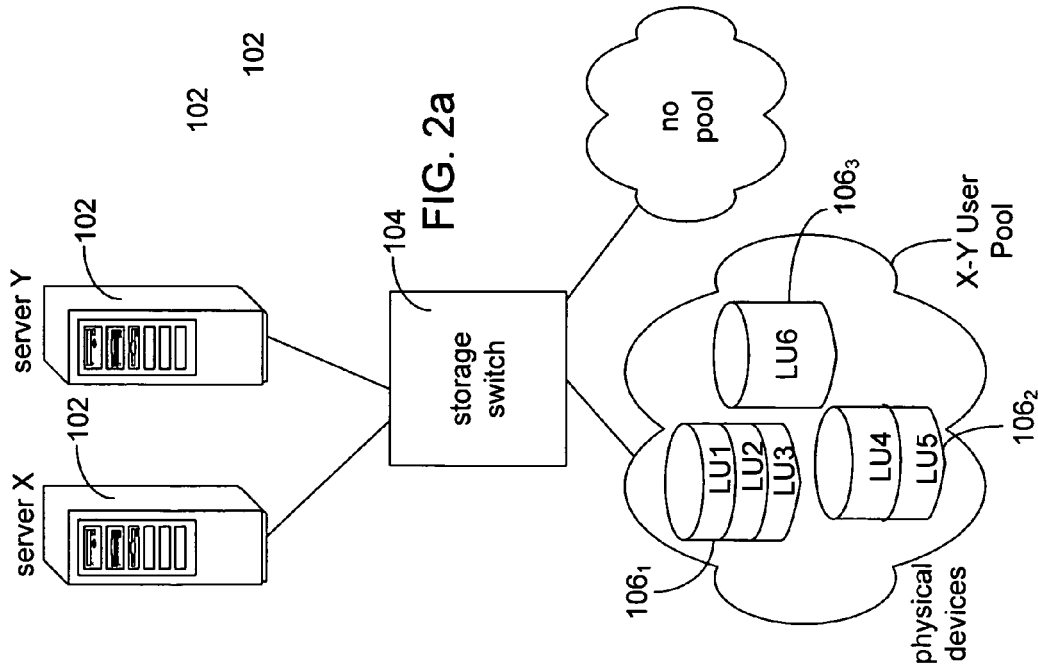

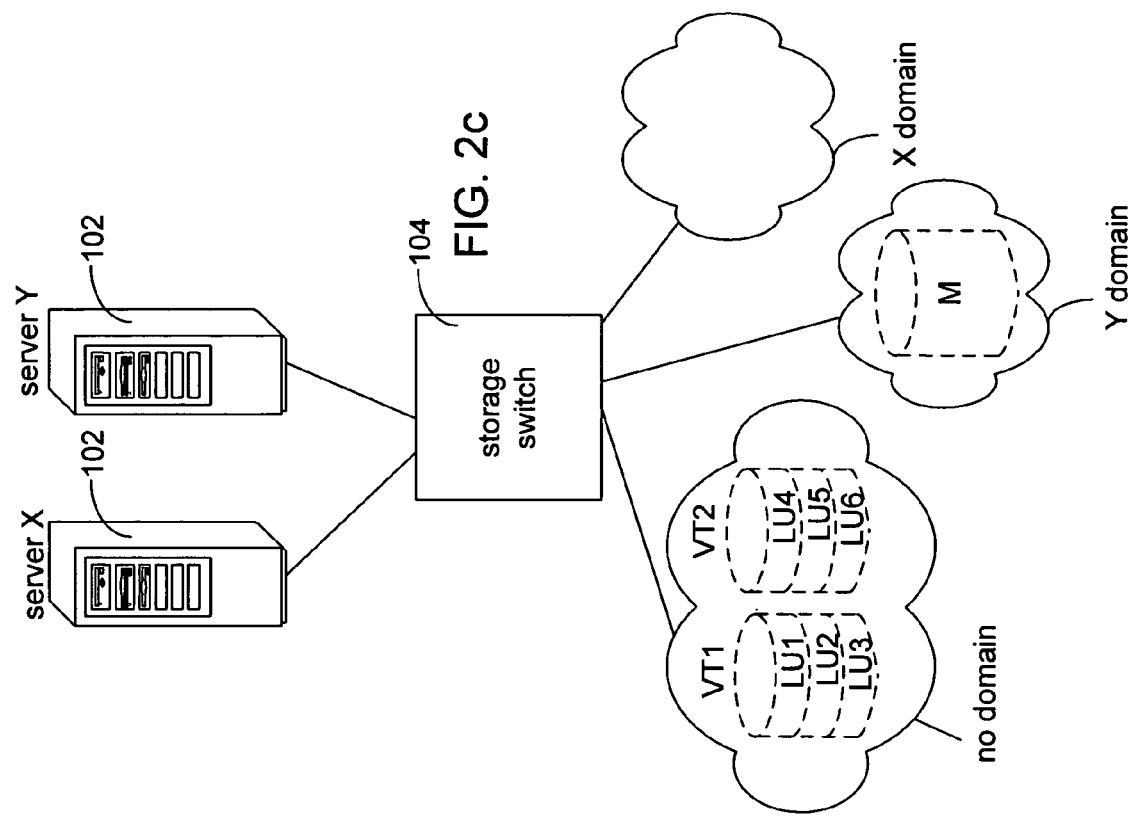

Fig. 7a
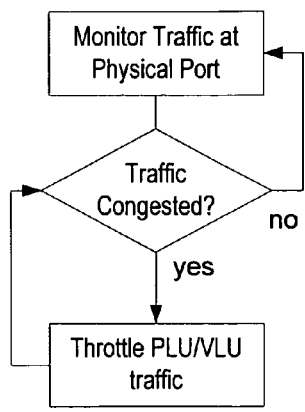
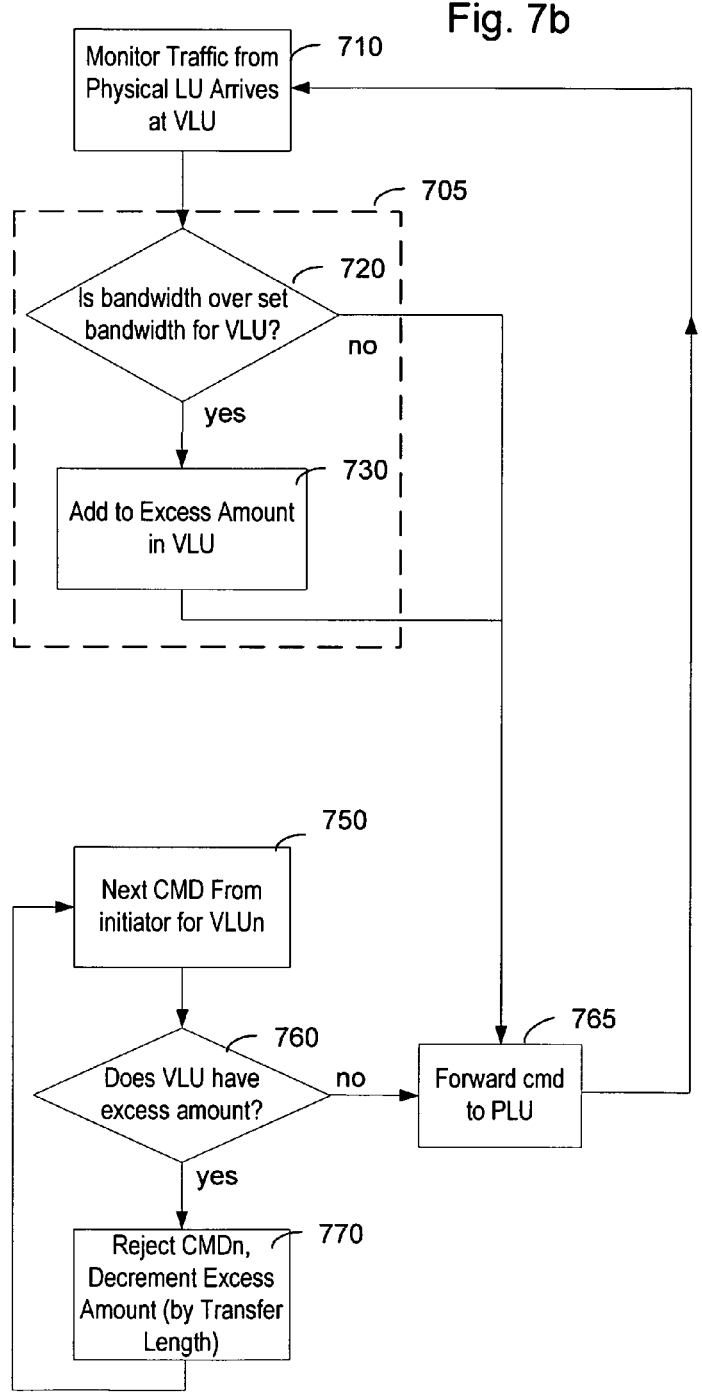
Fig. 7b

STORAGE SWITCH TRAFFIC BANDWIDTH CONTROL

CROSS-REFERENCE TO RELATED APPLICATIONS

The following applications are cross-referenced and incorporated by reference herein in their entirety:

U.S. patent application Ser. No. 10/051,321, entitled STORAGE SWITCH FOR STORAGE AREA NETWORK, filed Jan. 18, 2002;

U.S. patent application Ser. No. 10/051,339, entitled ENFORCING QUALITY OF SERVICE IN A STORAGE NETWORK, filed Jan. 18, 2002, now U.S. Pat. No. 7,421,509, issued Sep. 2, 2008; and U.S. patent application Ser. No. 10/051,053, entitled LOAD BALANCING IN A STORAGE NETWORK, filed Jan. 18, 2002, now abandoned.

BACKGROUND OF THE INVENTION

1. Field of the Invention

The present invention is directed to bandwidth control in a storage switch.

2. Description of the Related Art

Storage Area Networks (SAN) have gained popularity in recent years. A SAN is defined by the Storage Networking Industry Association (SNIA) as a network whose primary purpose is the transfer of data between computer systems and storage elements and among storage elements. A storage area network (SAN) is a high-speed special-purpose network (or subnetwork) that interconnects different kinds of data storage devices with associated data servers on behalf of a larger network of users. Unlike connecting a storage device directly to a server, e.g., with a SCSI connection, and unlike adding a storage device to a LAN with a traditional interface such as Ethernet (e.g., a NAS system), the SAN forms essentially an independent network that does not tend to have the same bandwidth limitations as its direct-connect SCSI and NAS counterparts and also provides increased configurability and scalability.

In a SAN environment, storage devices (e.g., tape drives and RAID arrays) and servers are generally interconnected via various switches and appliances. The connections to the switches and appliances are usually Fibre Channel. This structure generally allows for any server on the SAN to communicate with any storage device and vice versa. It also provides alternative paths from server to storage device. In other words, if a particular server is slow or completely unavailable, another server on the SAN can provide access to the storage device. A SAN also makes it possible to mirror data, making multiple copies available and thus creating more reliability in the availability of data. When more storage is needed, additional storage devices can be added to the SAN without the need to be connected to a specific server; rather, the new devices can simply be added to the storage network and can be accessed from any point.

While typical SAN appliances do perform some switching, because there may be a large number of servers (many more than three), and because each appliance has few ports (usually only two or four), separate switches are needed to connect the many servers to the few appliances. Nevertheless, typical switches have little built-in intelligence and merely forward data to a selected appliance.

Co-pending patent application Ser. No. 10/051,321 discloses a device which solves many of the issues attending the use of SANs through the introduction of a storage switch. The switch is capable of routing data between initiators and targets without buffering the data as required by earlier appliances used in SAN's. For example, some storage switches can route data packets without introducing more latency to the packets than would be introduced by a typical network switch. Such unbuffered data transfer between initiators and targets must be handled reliably and efficiently by the switch performing the interconnection. An example of a storage switch can be found in co-pending U.S. patent application Ser. No. 10/051,396, entitled VIRTUALIZATION IN A STORAGE SYSTEM, filed Jan. 18, 2002.

Initiators typically couple to the switch and access one or more virtual and physical targets through the switch. One issue which may arise from coupling through the switch is a bandwidth overload on the port. Since data losses in a SAN are not acceptable, bandwidth management on the part relative to the virtual targets must be provided.

SUMMARY OF THE INVENTION

The present invention, roughly described, pertains to a method for use in a system for storing and accessing data. The system includes at least one initiator, at least one target, and at least one switch having a port. The method may comprise the steps of determining whether congestion occurs at the physical port; and controlling bandwidth usage by each of said at least two targets based on minimum and maximum bandwidth settings for each of the targets.

In a further aspect, the step of controlling comprises rejecting additional commands from the initiator to at least one of the two targets.

In another embodiment, the invention is a method for use in a system for storing and accessing data. The system includes at least one initiator, at least two targets, and at least one switch having a port. In this embodiment, the method comprises monitoring traffic bandwidth from each of said at least two targets to the port; determining which target should have access to port resources based on a minimum and maximum bandwidth setting for each target; and controlling access to said targets by rejecting additional commands to the target based on the step of determining.

In a further aspect, the step of determining comprises assigning a priority to each target based on a weighting of traffic form each of said at least two targets. Still further, the step of assigning a weight includes marking the traffic using a two rate, three color marker.

In yet another embodiment, the invention is method for use in a system for storing and accessing data. The system includes at least one initiator, at least one target, at least one virtual logical unit, at least one physical logical units, and at least one switch having a port, the port accessing each physical logical unit through the switch. In this embodiment, the method comprises monitoring the bandwidth consumed by each of said at least two virtual targets as a result of traffic from the associated physical logical unit; determining which target should have access to port resources based on a weighting of traffic returning from a virtual target; and restricting access to said virtual targets by rejecting additional commands to the target based on the weighting of the target.

In a further aspect, the step of determining comprises recording contention counts for each virtual target.

In yet another embodiment, the invention is a storage switch having at least one physical port providing access to at least one target. The switch includes load balancing circuitry affiliated with the port including a memory storing a record of each target, the record including a minimum and maximum bandwidth allocation for the virtual logical unit; and processing circuitry affiliated with the port including a bandwidth monitor for each of said at least two targets, the processing circuitry maintaining a weighted record of bandwidth used by each target and rejecting additional commands to at least one target based on the record if the physical port is congested.

In a still further embodiment, the invention is a storage network. The storage network may include an initiator, at least one target and a switch. The switch may include at least one port coupled to the initiator, the switch providing access to the targets, the switch including at least one processor associated with the port having a record including bandwidth allocations for each of said at least two targets. The processor includes code operable to instruct the processor to: monitor bandwidth consumed by each of said at least two targets, determine which target should have access to port resources based on a weighting of traffic returning from a target to the port, and control access to said targets by rejecting additional commands to the target based on the weighting of the target.

In another aspect, the invention is a method for monitoring bandwidth in a storage switch, the switching including at least one physical port coupling at least one target and at least one initiator via the physical port. The method may include the steps of determining whether congestion occurs on the physical port; assigning a weight to bandwidth usage between the initiator and the target based on a minimum and maximum bandwidth settings for each target.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

BRIEF DESCRIPTION OF THE DRAWINGS

FIGS. 2a-2c are generalized functional block diagrams of a storage area network illustrating an exemplary provisioning of virtual targets;

FIG. 7a is a flow chart illustrating a general embodiment of the present invention;

FIG. 7b is a flow chart illustrating the a first method of the present invention for controlling bandwidth within a switch;

DETAILED DESCRIPTION

Figure 1:
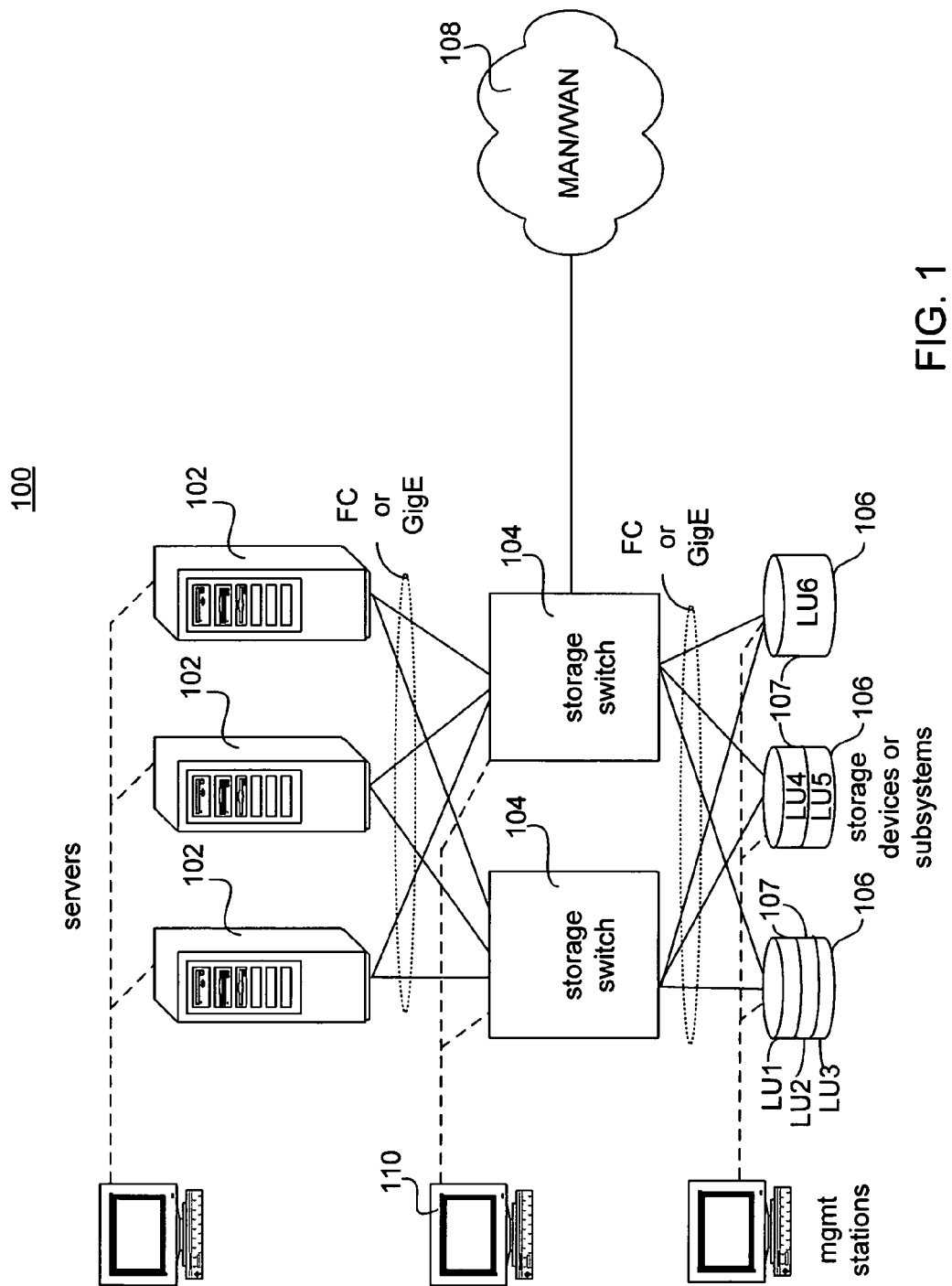
FIG. 1 depicts a generalized functional block diagram of a storage switch in accordance with one embodiment.

An exemplary system 100 including a storage switch in accordance with one embodiment is illustrated in FIG. 1. System 100 can include a plurality of initiating devices such as servers 102. It will be appreciated that more or fewer servers can be used and that embodiments can include any suitable physical initiator in addition to or in place of servers 102. Although not shown, the servers could also be coupled to a LAN. As shown, each server 102 is connected to a storage switch 104. In other embodiments, however, each server 102 may be connected to fewer than all of the storage switches 104 present. The connections formed between the servers and switches can utilize any protocol, although in one embodiment the connections are Fibre Channel or Gigabit Ethernet (carrying packets in accordance with the iSCSI protocol). Other embodiments may use the Infiniband protocol, defined by Intel Inc., or other protocols or connections.

In some embodiments, one or more switches 104 are each coupled to a Metropolitan Area Network (MAN) or Wide Area Network (WAN) 108, such as the Internet. The connection formed between a storage switch 104 and a WAN 108 will generally use the Internet Protocol (IP) in most embodiments. Although shown as directly connected to MAN/WAN 108, other embodiments may utilize a router (not shown) as an intermediary between switch 104 and MAN/WAN 108.

In addition, respective management stations 110 are connected to each storage switch 104, to each server 102, and to each storage device 106. Although management stations are illustrated as distinct computers, it is to be understood that the software to manage each type of device could collectively be on a single computer.

Such a storage switch 104, in addition to its switching function, can provide virtualization and storage services (e.g., mirroring). Such services can include those that would typically be provided by appliances in conventional architectures.

In addition, the intelligence of a storage switch in accordance with an embodiment of the invention is distributed to every switch port. This distributed intelligence allows for system scalability and availability. The distributed intelligence allows a switch in accordance with an embodiment to process data at "wire speed," meaning that a storage switch 104 introduces no more latency to a data packet than would be introduced by a typical network switch. Thus, "wire speed" for the switch is measured by the connection to the particular port. Accordingly, in one embodiment having OC-48 connections, the storage switch can keep up with an OC-48 speed (2.5 bits per ns). A two Kilobyte packet (with 10 bits per byte) moving at OC-48 speed can take as little as eight microseconds coming into the switch. A one Kilobyte packet can take as little as four microseconds. A minimum packet of 100 bytes can only elapse a mere 400 ns.

More information on various storage area networks, including a network as illustrated in FIG. 1 can be found in U.S. patent application Ser. No. 10/051,396, entitled VIRTUALIZATION IN A STORAGE SYSTEM, filed Jan. 18, 2002 and U.S. patent application Ser. No. 10/051,321, entitled STORAGE SWITCH FOR STORAGE AREA NETWORK, filed Jan. 18, 2002.

"Virtualization" generally refers to the mapping of a virtual target space subscribed to by a user to a space on one or more physical storage target devices. The terms "virtual" and "virtual target" come from the fact that storage space allocated per subscription can be anywhere on one or more physical storage target devices connecting to a storage switch 104. The physical space can be provisioned as a "virtual target" which may include one or more "logical units" (LUs), also referred to herein as "Virtual Logical Units (VLUs). Each virtual target consists of one or more LUs identified with one or more LU numbers (LUNs), which are frequently used in the iSCSI and FC protocols. Each logical unit is generally comprised of one or more extents—a contiguous slice of storage space on a physical device. Thus, a virtual target may occupy a whole storage device (one extent), a part of a single storage device (one or more extents), or parts of multiple storage devices (multiple extents). The physical devices, the LUs, the number of extents, and their exact locations are immaterial and invisible to a subscriber user.

Storage space may come from a number of different physical devices, with each virtual target belonging to one or more "pools" in various embodiments, sometimes referred to herein as "domains." Only users of the same domain are allowed to share the virtual targets in their domain in one embodiment. Domain-sets can also be formed that include several domains as members. Use of domain-sets can ease the management of users of multiple domains, e.g., if one company has five domains but elects to discontinue service, only one action need be taken to disable the domain-set as a whole. The members of a domain-set can be members of other domains as well.

FIGS. 2a-2c illustrates one example of provisioning virtual targets in a storage area network. The system of FIG. 2 includes three physical devices 106₁, 106₂, and 106₃, having a total of 6 LUs—LU1, LU2, LU3, LU4, LU5, LU6. In FIG. 2a, each physical device is coupled to a switch and placed in a pool accessible to two initiators X and Y, the "X-Y User Pool."

If initiator X and initiator Y each require one virtual target, then in one embodiment, the LUs are provisioned to form virtual targets VT1 and VT2, where VT1 includes as extents LUs 1-3 and VT2 includes as extents LUs 4-6 as depicted in FIG. 2b. VT1 is placed in the server X user domain and VT2 is placed in the server Y user domain. Initiator X will have access to VT1 but no VT2, while initiator Y will have access to VT2 but not VT1.

If instead, for example, initiator Y requires a mirrored virtual target M with a total of 6 LUs, VT1 and VT2 can be created as members of the virtual target M. VT1 and VT2 can be placed in the switch's No Domain (a domain where the physical targets are not directly accessible to users) while M is made accessible to Y, as shown in FIG. 2c. As members of M, VT1 and VT2 will not be independently accessible. VT1 is comprised of a LUs 1-3 (physical device 106₁), while VT2 is comprised of LUs 4-6 (physical devices 106₂ and 106₃). When a request is received to write data to the virtual target M, switch 104 will route the incoming data to both VT1 (physical device 106₁) and VT2 (physical device 106₂ and/or106₃), thus storing the data in at least two physical locations.

Figure 3:
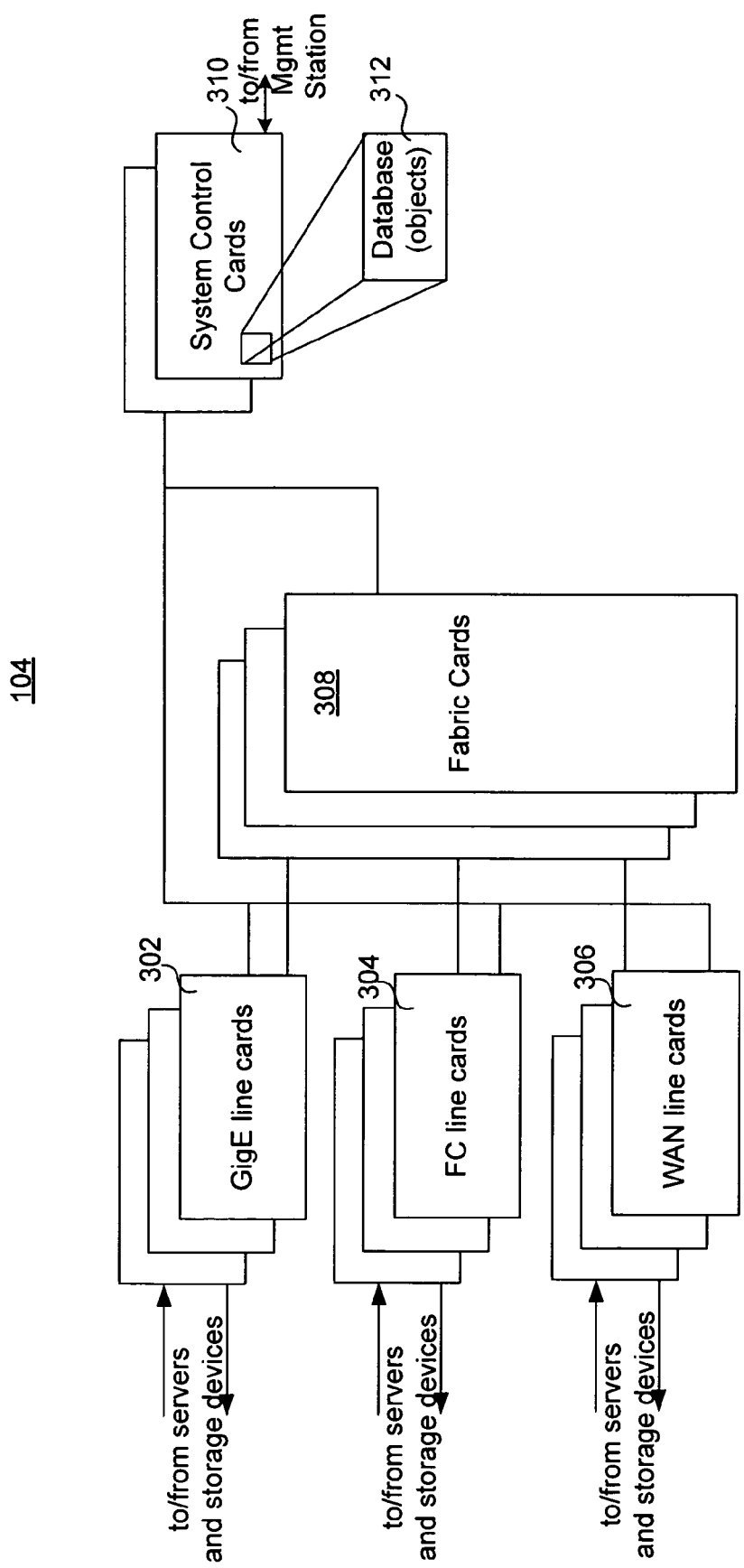
FIG. 3 is a generalized functional block diagram of a storage switch in accordance with one embodiment.

FIG. 3 illustrates a functional block diagram of a storage switch 104 in accordance with an embodiment of the invention. More information regarding the details of a storage switch such as storage switch 104 and its operation can be found in U.S. patent application Ser. No. 10/051,321, entitled STORAGE SWITCH FOR STORAGE AREA NETWORK, filed Jan. 18, 2002. In one embodiment, the storage switch 104 includes a plurality of linecards 302, 304, and 306, a plurality of fabric cards 308, and two system control cards 310, each of which will be described in further detail below. Although an exemplary storage switch is illustrated, it will be appreciated that numerous other implementations and configurations can be used in accordance with various embodiments.

System Control Cards. Each of the two System Control Cards (SCCs) 310 connects to every line card 302, 304, 306. In one embodiment, such connections are formed by I²C signals, which are well known in the art, and through an Ethernet connection with the SCC. The SCC controls power up and monitors individual linecards, as well as the fabric cards, with the I²C connections. Using inter-card communication over the ethernet connections, the SCC also initiates various storage services, e.g., snapshot and replicate.

In addition, the SCC maintains a database 312 that tracks configuration information for the storage switch as well as all virtual targets and physical devices attached to the switch, e.g., servers and storage devices. In addition, the database keeps information regarding usage, error and access data, as well as information regarding different domains and domain sets of virtual targets and users. The records of the database may be referred to herein as "objects." Each initiator (e.g., a server) and target (e.g., a storage device) has a World Wide Unique Identifier (WWUI), which are known in the art. The database is maintained in a memory device within the SCC, which in one embodiment is formed from flash memory, although other memory devices can be used in various embodiments.

The storage switch 104 can be reached by a management station 110 through the SCC 310 using an ethernet connection. Accordingly, the SCC also includes an additional Ethernet port for connection to a management station. An administrator at the management station can discover the addition or removal of storage devices or virtual targets, as well as query and update virtually any object stored in the SCC database 312.

Fabric Cards. In one embodiment of switch 104, there are three fabric cards 308, although other embodiments could have more or fewer fabric cards. Each fabric card 308 is coupled to each of the linecards 302, 304, 306 in one embodiment and serves to connect all of the linecards together. In one embodiment, the fabric cards 308 can each handle maximum traffic when all linecards are populated. Such traffic loads handled by each linecard are up to 160 Gbps in one embodiment although other embodiments could handle higher or lower maximum traffic volumes. If one fabric card 308 fails, the two surviving cards still have enough bandwidth for the maximum possible switch traffic: in one embodiment, each linecard generates 20 Gbps of traffic, 10 Gbps ingress and 10 Gbps egress. However, under normal circumstances, all three fabric cards are active at the same time. From each linecard, the data traffic is sent to any one of the three fabric cards that can accommodate the data.

Linecards. The linecards form connections to servers and to storage devices. In one embodiment, storage switch 104 supports up to sixteen linecards although other embodiments could support a different number. Further, in one embodiment, three different types of linecards are utilized: Gigabit Ethernet (GigE) cards 302, Fibre Channel (FC) cards 304, and WAN cards 306. Other embodiments may include more or fewer types of linecards. The GigE cards 302 are for Ethernet connections, connecting in one embodiment to either iSCSI servers or iSCSI storage devices (or other Ethernet based devices). The FC cards 304 are for Fibre Channel connections, connecting to either Fibre Channel Protocol (FCP) servers or FCP storage devices. The WAN cards 306 are for connecting to a MAN or WAN.

Figure 4:
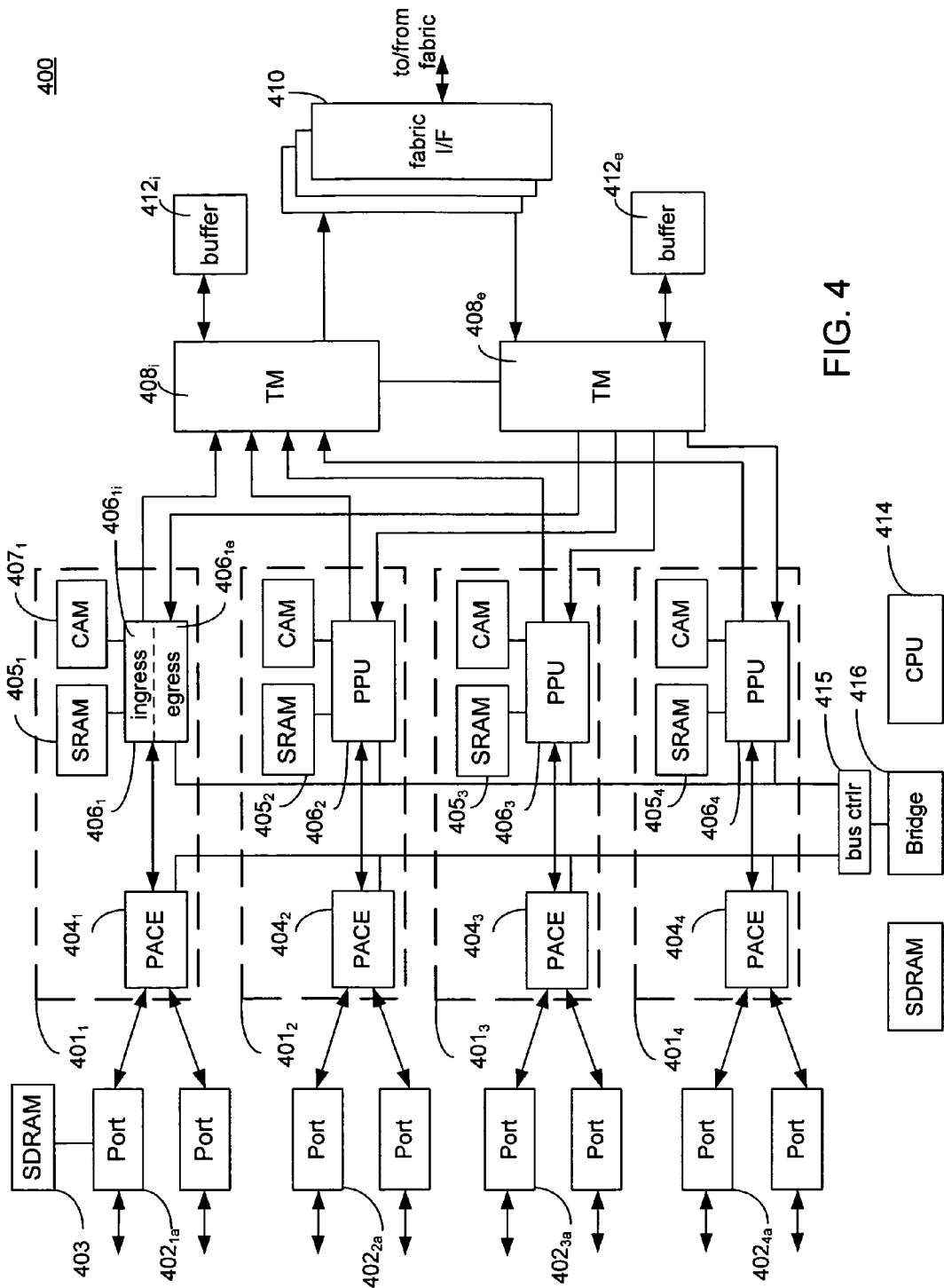
FIG. 4 is a generalized functional block diagram of a linecard used in a storage switch in accordance with one embodiment.

FIG. 4 illustrates a functional block diagram of a generic line card 400 used in a storage switch 104 in accordance with one embodiment. Line card 400 is presented for exemplary purposes only. Other line cards and designs can be used in accordance with embodiments. The illustration shows those components that are common among all types of linecards, e.g., GigE 302, FC 304, or WAN 306. In other embodiments other types of linecards can be utilized to connect to devices using other protocols, such as Infiniband.

Ports. Each line card 400 includes a plurality of ports 402. The ports form the linecard's connections to either servers or storage devices. Eight ports are shown in the embodiment illustrated, but more or fewer could be used in other embodiments. For example, in one embodiment each GigE card can support up to eight 1 Gb Ethernet ports, each FC card can support up to either eight 1 Gb FC ports or four 2 Gb FC ports, and each WAN card can support up to four OC-48 ports or two OC-192 ports. Thus, in one embodiment, the maximum possible connections are 128 ports per switch 104. The ports of each linecard are full duplex in one embodiment, and connect to either a server or other client, and/or to a storage device or subsystem.

In addition, each port 402 has an associated memory 403. Although only one memory device is shown connected to one port, it is to be understood that each port may have its own memory device or the ports may all be coupled to a single memory device. Only one memory device is shown here coupled to one port for clarity of illustration.

Storage Processor Unit. In one embodiment, each port is associated with a Storage Processor Unit (SPU) 401. In one embodiment the SPU rapidly processes the data traffic allowing for wire-speed operations. In one embodiment, each SPU includes several elements: a Packet Aggregation and Classification Engine (PACE) 404, a Packet Processing Unit (PPU) 406, an SRAM 405, and a CAM 407. Still other embodiments may use more or fewer elements or could combine elements to obtain the same functionality. For instance, some embodiments may include a PACE and a PPU in the SPU, but the SPU may share memory elements with other SPUs.

PACE. Each port is coupled to a Packet Aggregation and Classification Engine (PACE) 404. As illustrated, the PACE 404 aggregates two ports into a single data channel having twice the bandwidth. For instance, the PACE 404 aggregates two 1 Gb ports into a single 2 Gb data channel. The PACE can classify each received packet into a control packet or a data packet. Control packets are sent to the CPU 414 for processing, via bridge 416. Data packets are sent to a Packet Processing Unit (PPU) 406, discussed below, with a local header added. In one embodiment the local header is sixteen bytes resulting in a data "cell" of 64 bytes (16 bytes of header and 48 bytes of payload). The local header is used to carry information and used internally by switch 104. The local header is removed before the packet leaves the switch. Accordingly, a "cell" can be a transport unit used locally in the switch that includes a local header and the original packet (in some embodiments, the original TCP/IP headers are also stripped from the original packet). Nonetheless, not all embodiments of the invention will create a local header or have "internal packets" (cells) that differ from external packets. Accordingly, the term "packet" as used herein can refer to either "internal" or "external" packets.

The classification function helps to enable a switch to perform storage virtualization and protocol translation functions at wire speed without using a store-and-forward model of conventional systems. Each PACE has a dedicated path to a PPU, e.g. PPU $406_1$, while all four PACEs in the illustrated embodiment share a path to the CPU 414, which in one embodiment is a 104 MHz/32 (3.2 Gbps) bit data path.

Packet Processing Unit (PPU). Each PPU such as PPU $406_1$ performs virtualization and protocol translation on-the-fly, meaning that cells are not buffered for such processing. It also implements other switch-based storage service functions, described later. The PPU is capable, in one embodiment, of moving cells at OC-48 speed or 2.5 Gbps for both the ingress and egress directions, while in other embodiments it can move cells at OC-192 speeds or 10 Gbps. The PPU in one embodiment includes an ingress PPU $406_{1i}$ and an egress PPU $406_{1e}$, which both run concurrently. The ingress PPU $406_{1i}$ receives incoming data from PACE $404_1$ and sends data to the Traffic Manager $408_i$ while the egress PPU $406_{1e}$ receives data from Traffic Manager $408_e$ and sends data to a PACE $404_1$. Although only one PPU $406_1$ is shown in FIG. 4 as having an ingress PPU $406_{1i}$ and an egress PPU $406_{1e}$, it is to be understood that in one embodiment all PPUs 406 will include both an ingress and an egress PPU and that only one PPU is shown in FIG. 4 with both ingress and egress PPUs for clarity of illustration.

A large number of storage connections (e.g., server to virtual target) can be established concurrently at each port. Nonetheless, each connection is unique to a virtual target and can be uniquely identified by a TCP Control Block Index (in the case of iSCSI connections) and a port number. When a connection is established, the CPU 414 of the linecard 400 informs a PPU 406 of an active virtual target by sending it a Virtual Target Descriptor (VTD) for the connection. The VTD includes all relevant information regarding the connection and virtual target that the PPU will need to properly operate on the data, e.g., perform virtualization, translation, and various storage services. The VTD is derived from an object in the SCC database and usually contains a subset of information that is stored in the associated object in the SCC database.

Similarly, Physical Target Descriptors (PTDs) are utilized in an embodiment of the invention. PTDs describe the actual physical devices, their individual LUs, or their individual extents (a contiguous part of or whole LU) and will include information similar to that for the VTD. Also, like the VTD, the PTD is derived from an object in the SCC database.

To store the VTDs and PTDs and have quick access to them, in one embodiment the PPUs such as PPU $406_1$ are connected to an SRAM $405_1$ and CAM $407_1$. SRAM $405_1$ can store a VTD and PTD database. A listing of VTD Identifiers (VTD IDs), or addresses, as well as PTD Identifiers (PTD IDs), is also maintained in the PPU CAM $407_1$ for quick accessing of the VTDs. The VTD IDs are indexed (mapped) using a TCP Control Block Index and a LUN. The PTD IDs are indexed using a VTD ID. In addition, for IP routing services, the CAM $407_1$ contains a route table, which is updated by the CPU when routes are added or removed.

In various embodiments, each PPU will be connected with its own CAM and SRAM device as illustrated, or the PPUs will all be connected to a single CAM and/or SRAM (not illustrated).

For each outstanding request to the PPU (e.g., reads or writes), a task control block is established in the PPU SRAM 407 to track the status of the request. There are ingress task control blocks (ITCBs) tracking the status of requests received by the storage switch on the ingress PPU and egress task control blocks (ETCBs) tracking the status of requests sent out by the storage switch on the egress PPU. For each virtual target connection, there can be a large number of concurrent requests, and thus many task control blocks. Task control blocks are allocated as a request begins and freed as the request completes.

Traffic Manager. There are two traffic managers (TMs) 408 on each linecard 400: one TM $408_i$ for ingress traffic and one TM $408_e$ for egress traffic. The ingress TM receives cells from all four SPUs, in the form of 64-byte data cells, in one embodiment. In such an embodiment, each data cell has 16 bytes of local header and 48 bytes of payload. The header contains a FlowID that tells the TM the destination port of the cell. In some embodiments, the SPU may also attach a TM header to the cell prior to forwarding the cell to the TM. Either the TM or the SPU can also subdivide the cell into smaller cells for transmission through the fabric cards in some embodiments.

The ingress TM sends data cells to the fabric cards via a 128-bit 104 Mhz interface 410 in one embodiment. Other embodiments may operate at 125 Mhz or other speeds. The egress TM receives the data cells from the fabric cards and delivers them to the four SPUs.

Both ingress and egress TMs have a large buffer 412 to queue cells for delivery. Both buffers 412 for the ingress and egress TMs are 64 MB, which can queue a large number of packets for internal flow control within the switch. The cells are not buffered as in cached or buffered switch implementations. There is no transport level acknowledgement as in these systems. The cells are only temporarily buffered to maintain flow control within the switch. The cells maintain their original order and there is no level high level processing of the cells at the TM. The SPUs can normally send cells to the ingress TM quickly as the outgoing flow of the fabric cards is as fast as the incoming flow. Hence, the cells are moving to the egress TM quickly. On the other hand, an egress TM may be backed up because the outgoing port is jammed or being fed by multiple ingress linecards. In such a case, a flag is set in the header of the outgoing cells to inform the egress SPU to take actions quickly. The egress TM also sends a request to the ingress SPU to activate a flow control function used in providing Quality of Service for Storage access. It is worth noting that, unlike communications traffic over the Internet, for storage traffic dropping a packet or cell is unacceptable. Therefore, as soon as the amount of cells in the buffer exceeds a specified threshold, the SPU can activate its flow control function to slow down the incoming traffic to avoid buffer overflow.

Fabric Connection. The fabric connection 410 converts the 256-bit parallel signals of the TM (128 bits ingress and 128 bits egress, respectively), into a 16-bit serial interface (8-bit ingress and 8-bit egress) to the backplane at 160 Gbps. Thus the backplane is running at one sixteenth of the pins but sixteen times faster in speed. This conversion enables the construction of a high availability backplane at a reasonable cost without thousands of connecting pins and wires. Further, because there are three fabric cards in one embodiment, there are three high-speed connectors on each linecard in one embodiment, wherein the connectors each respectively connect the 8-bit signals to a respective one of the three fabric cards. Of course, other embodiments may not require three fabric connections 410.

CPU. On every linecard there is a processor (CPU) 614, which in one embodiment is a PowerPC 750 Cxe. In one embodiment, CPU 414 connects to each PACE with a 3.2 Gb bus, via a bus controller 415 and a bridge 416. In addition, CPU 414 also connects to each PPU, CAM and TM, however, in some embodiments this connection is slower at 40 Mbps. Both the 3.2 Gb and 40 Mb paths allow the CPU to communicate with most devices in the linecard as well as to read and write the internal registers of every device on the linecard, download microcode, and send and receive control packets.

The CPU on each linecard is responsible to initialize every chip at power up and to download microcode to the SPUs and each port wherever the microcode is needed. Once the linecard is in running state, the CPU processes the control traffic. For information needed to establish a virtual target connection, the CPU requests the information from the SCC, which in turn gets the information from an appropriate object in the SCC database.

Distinction in Linecards—Ports. The ports in each type of linecard, e.g., GigE, FC, or WAN are distinct as each linecard supports one type of port in one embodiment. In other embodiments, other linecard ports could be designed to support other protocols, such as Infiniband.

GigE Port. A gigabit Ethernet port connects to iSCSI servers and storage devices. While the GigE port carries all kinds of Ethernet traffic, the only network traffic generally to be processed by a storage switch 104 at wire speed in accordance with one embodiment of the invention is an iSCSI Packet Data Unit (PDU) inside a TCP/IP packet. Nonetheless, in other embodiments packets in accordance with other protocols (like Network File System (NFS)) carried over Ethernet connections may be received at the GigE Port and processed by the SPU and/or CPU.

The GigE port receives and transmits TCP/IP segments for virtual targets or iSCSI devices. To establish a TCP connection for a virtual target, both the linecard CPU 414 and the SCC 310 are involved. When a TCP packet is received, and after initial handshaking is performed, a TCP control block is created and stored in the GigE port memory 403. A VTD is also retrieved from an object of the SCC database and stored in the CPU SDRAM 405 for the purpose of authenticating the connection and understanding the configuration of the virtual target. The TCP Control Block identifies a particular TCP session or iSCSI connection to which the packet belongs, and contains in one embodiment, TCP segment numbers, states, window size, and potentially other information about the connection. In addition, the TCP Control Block is identified by an index, referred to herein as the "TCP Control Block Index." A VTD for the connection can be created and stored in the SPU SRAM 405. The CPU creates the VTD by retrieving the VTD information stored in its SDRAM and originally obtained from the SCC database. A VTD ID is established in a list of VTD IDs in the SPU CAM 407 for quick reference to the VTD. The VTD ID is affiliated with and indexed by the TCP Control Block Index.

When the port receives iSCSI PDUs, it serves essentially as a termination point for the connection, but then the switch initiates a new connection with the target. After receiving a packet on the ingress side, the port delivers the iSCSI PDU to the PACE with a TCP Control Block Index, identifying a specific TCP connection. For a non-TCP packet or a TCP packet not containing an iSCSI PDU, the port receives and transmits the packet without acting as a termination point for the connection. Typically, the port 402 communicates with the PACE 404 that an iSCSI packet is received or sent by using a TCP Control Block Index. When the TCP Control Block Index of a packet is −1, it identifies a non-iSCSI packet.

FC Port. An FC port connects to servers and FC storage devices. The FC port appears as a fibre channel storage subsystem (i.e., a target) to the connecting servers, meaning, it presents a large pool of virtual target devices that allow the initiators (e.g., servers) to perform a Process Login (PLOGI or PRLI), as are understood in the art, to establish a connection. The FC port accepts the GID extended link services (ELSs) and returns a list of target devices available for access by that initiator (e.g., server).

When connecting to fibre channel storage devices, the port appears as a fibre channel F-port, meaning, it accepts a Fabric Login, as is known in the art, from the storage devices and provides name service functions by accepting, and processing the GID requests—in other words, the port will appear as an initiator to storage devices.

In addition, an FC port can connect to another existing SAN network, appearing in such instances as a target with many LUs to the other network.

At the port initialization, the linecard CPU can go through both sending Fabric Logins, Process Logins, and GIDs as well as receive the same. The SCC supports an application to convert FC ELS's to iSNS requests and responses. As a result, the same database in the SCC keeps track of both the FC initiators (e.g., servers) and targets (e.g., storage devices) as if they were iSCSI initiators and targets.

When establishing an FC connection, unlike for a GigE port, an FC port does not need to create TCP control blocks or their equivalent; all the necessary information is available from the FC header. But, a VTD (indexed by a D_ID which identifies the destination of a frame) will still need to be established in a manner similar to that described for the GigE port.

An FC port can be configured for 1 Gb or 2 Gb. As a 1 Gb port, two ports are connected to a single PACE as illustrated in FIG. 4; but in an embodiment where it is configured as a 2 Gb port, port traffic and traffic that can be accommodated by the SPU should match to avoid congestion at the SPU. The port connects to the PACE with a POS/PHY interface in one embodiment. Each port can be configured d separately, i.e. one PACE may have two 1 Gb ports and another PACE has a single 2 Gb port.

WAN Ports. In embodiments that include a WAN linecard, the WAN linecard supports OC-48 and OC-192 connections in one embodiment. Accordingly, there are two types of WAN ports: OC-48 and OC-192. For OC-48, there is one port for each SPU. There is no aggregation function in the PACE, although there still is the classification function. A WAN port connects to SONET and works like a GigE port as it transmits and receives network packets such as ICMP, RIP, BPG, IP and TCP. A WAN port in one embodiment supports network security with VPN and IPSec that requires additional hardware components.

Since OC-192 results in a faster wire speed, a faster SPU will be required in embodiments that support OC-192.

Switch-Based Storage Operations

One of ordinary skill in the art will have a general knowledge of the iSCSI and FC protocols. However, for more information on iSCSI refer to "draft-ieff-ips-iSCSI-09.txt," an Internet Draft and work in progress by the Internet Engineering Task Force (IETF), Nov. 19, 2001, incorporated by reference herein. For more information about Fibre Channel (FC) refer to "Information Systems—dpANS Fibre Channel Protocol for SCSI," Rev. 012, Dec. 4, 1995 (draft proposed American National Standard), incorporated by reference herein. In addition, both are further described in U.S. patent application Ser. No. 10/051,321, entitled STORAGE SWITCH FOR STORAGE AREA NETWORK, filed Jan. 18, 2002.

Virtualization

Exemplary ingress and egress processes for various packet types are described in co-pending application Ser. Nos. 10/051,321, 10/051,339 and 10/051,053. It will be understood that numerous processes for various packet types can be used in accordance with various embodiments.

In one embodiment, after an incoming packet is classified as data or control traffic by the PPU, the PPU can perform virtualization for data packets without data buffering. For each packet received, the PPU determines the type of packet (e.g., command, R2T/XFER_RDY, Write Data, Read Data, Response, Task Management/Abort) and then performs either an ingress (where the packet enters the switch) or an egress (where the packet leaves the switch) algorithm to translate the virtual target to a physical target or vice versa. Thus, the virtualization function is distributed amongst ingress and egress ports. To further enable wire-speed processing, virtual descriptors are used in conjunction with a CAM, to map the request location to the access location. In addition, for each packet there may be special considerations. For instance, the virtual target to which the packet is destined may be spaced over several noncontiguous extents, may be mirrored, or both.

Command Packet—Ingress

To initiate a transfer task to or from the virtual target, a SCSI command is sent by an iSCSI or FC initiator in an iSCSI PDU or FCP IU, respectively. When such a packet is received at the PPU (after classification), the PPU CAM is next checked to determine if a valid VTD ID exists, using the TCP Control Block Index and the logical unit number (LUN), in the case of an iSCSI initiator, or the S_ID (an identification of the source of the frame) and the LUN, in the case of an FC initiator. The LUNs in each case are found in the respective iSCSI PDU or FCP IU. If no valid VTD ID is found, then a response packet is sent back to the initiator. If a valid VTD is found, then a check is made for invalid parameters, step 508. If invalid parameters exists, a response packet is sent back to the iSCSI or FC initiator.

A Task Index is allocated along with an Ingress Task Control Block (ITCB). The Task Index points to or identifies the ITCB. The ITCB stores the FlowID (obtained from the VTD), the VTD ID, command sequence number or CmdSN (from the iSCSI packet itself), as well as an initiator (originator) identification (e.g., the initiator_task_tag sent in the iSCSI PDU or the OX_ID in the FCP frame header). The OX_ID is the originator (initiator) identification of the exchange. The ITCB is stored in the PPU SRAM. Of course there may be many commands in progress at any given time, so the PPU may store a number of ITCBs at any particular time. Each ITCB will be referenced by its respective Task Index.

The VTD tracks the number of outstanding commands to a particular virtual target, so when a new ITCB is established, it increments the number of outstanding commands. In some embodiments, VTDs establish a maximum number of commands that may be outstanding to any one particular virtual target. The FlowID, the VTD ID, and the Task Index are all copied into the local header. The FlowID tells the traffic manager the destination linecards and ports. Later, the Task Index will be returned by the egress port to identify a particular task of a packet. Finally, the packet is sent to the traffic manager and then the routing fabric, so that it ultimately reaches an egress PPU.

Command Packet—Egress

After a command PDU or IU has passed through the switch fabric, it will arrive at a PPU, destined for an egress port. The PPU attempts to identify the physical device(s) that the packet is destined for. To do so, the VTD ID from the local header is used to search the PPU CAM for a PTD ID (Physical Target Descriptor Identifier). The VTD ID is affiliated with and indexes a particular PTD ID associated with the particular egress PPU. PTDs are stored in the PPU SRAM, like VTDs, and also contain information similar to that found in a VTD. If the search is unsuccessful, it is assumed that this is a command packet sent directly by the CPU and no additional processing is required by the PPU, causing the PPU to pass the packet to the proper egress port based on the FlowID in the local header. If the search is successful, the PTD ID will identify the physical target (including extent) to which the virtual target is mapped and which is in communication with the particular egress linecard currently processing the packet.

The PPU next allocates a Task Index together with an egress task control block (ETCB). In an embodiment, the Task Index used for egress is the same as that used for ingress. The Task Index also identifies the ETCB. In addition, the ETCB also stores any other control information necessary for the command, including CmdSN of an iSCSI PDU or an exchange sequence for an FCP IU.

Using the contents of the PTD, the PPU converts the SCSI block address from a virtual target to the block address of a physical device. Adding the block address of the virtual target to the beginning block offset of the extent can provide this conversion. Next the PPU generates proper iSCSI CmdSN or FCP sequence ID, and places them in the iSCSI PDU or FCP frame header. The PPU also constructs the FCP frame header if necessary (in some embodiments, after the ingress PPU reads the necessary information from the FCP header, it will remove it, although other embodiments will leave it intact and merely update or change the necessary fields at this step) or for a packet being sent to an iSCSI target, the TCP Control Block Index is copied into the local header from the PTD. In addition, the PPU provides any flags or other variables needed for the iSCSI or FCP headers. The completed iSCSI PDU or FCP frame are then sent to the PACE, which in turn strips the local header, and passes the packet to appropriate port.

R2T or XFER RDY—Ingress

After a command has been sent to a target storage device as described above, and the command is a write command, an R2T PDU or an XFER_RDY IU will be received from a storage device when it is ready to accept write data. The PPU identifies the corresponding ETCB, by using the initiator_task_tag or OX_ID inside the packet. If the PPU cannot identify a valid ETCB because of an invalid initiator_task_tag or OX_ID, the packet is discarded. Otherwise, once the ETCB is identified, the PPU retrieves the Ingress Task Index (if different from the Egress Task Index) and the VTD ID from the ETCB. The PPU also retrieves the FlowID from the PTD, which is also identified in the ETCB by the PTD ID. The FlowID indicates to the traffic manager the linecard of the original initiator (ingress) port. The FlowID, the VTD ID, and the Task Index are copied into the local header of the packet. Finally the packet is sent to the traffic manager and the switch fabric.

R2T or XFER RDY—Egress

After the R2T or XFER_RDY packet emerges from the switch fabric, it is received by a PPU, on its way to be passed back to the initiator (the device that initiated the original command for the particular task). The Task Index identifies the ITCB to the PPU, from which ITCB the original initiator_task_tag and the VTD ID can be obtained. The R2T/XFER_RDY Desired Data Transfer Length or BURST_LEN field is stored in the ITCB. The local header is updated with the FCP D_ID or the TCP Control Block Index for the TCP connection. Note that the stored S_ID from the original packet, which is stored in the ITCB, becomes the D_ID. If necessary, an FCP frame header is constructed or its fields are updated. The destination port number is specified in the local header in place of the FlowID, and placed along with the initiator_task_tag in the SCSI PDU or, for an FC connection, the RX_ID and OX_ID are placed in the FCP frame. The RX_ID field is the responder (target) identification of the exchange. The PPU also places any other flags or variables that need to be placed in the PDU or FCP headers. The packet is forwarded to the PACE, which identifies the outgoing port from the local header. The local header is then stripped, and forwarded to the proper port for transmission.

In the event that the command is split over two or more extents, e.g., the command starts in one extent and ends in another, then the PPU must hold the R2T or XFER_RDY of the second extent until the data transfer is complete to the first extent, thus ensuring a sequential data transfer from the initiator. In addition, the data offset of the R2T or XFER_RDY of the second extent will need to be modified by adding the amount of data transferred to the first extent.

Write Data Packet—Ingress

After an initiator receives an R2T or XFER_RDY packet it returns a write-data packet. When a write-data iSCSI PDU or FC IU is received from an initiator, the ITCB to which the packet belongs must be identified. Usually, the ITCB can be identified using the RX_ID or the target_task_tag, which is the same as the Task Index in some embodiments. The SPU further identifies that received packets are in order. In some circumstances, however, the initiator will transfer unsolicited data: data that is sent prior to receiving an R2T or XFER_RDY. In such a case, the PPU must find the ITCB by a search through the outstanding tasks of a particular virtual target. But if the ITCB is not found, then the packet is discarded. If the ITCB is found, the total amount of data to be transferred is updated in the ITCB. The FlowID and Task Index are added to the local header of the packet. The packet is then forwarded to the traffic manager and ultimately to the switch fabric Write Data Packet—Egress When a write-data packet is received from the switch fabric (via the traffic manager), the ETCB for the packet needs to be identified. Typically, the ETCB can be identified using the Task Index in the local header. Once the ETCB is found, using the information inside the ETCB, the PPU generates proper iSCSI DataSN or FCP sequence ID, along with any other flags and variables, e.g, data offset, for the PDU or FCP frame header. The local header is updated with the TCP Control Block Index or the FCP D_ID from the PTD. The port number is also added to the local header. The finished iSCSI PDU or FCP frame is sent to the PACE, which removes the local header, and forwards the packet to the appropriate port.

Read Data Packet—Ingress

After receiving a read command, the target device will respond with a read-data packet, which will be received at the PPU (after undergoing classification in the PACE). The ETCB for the packet is then identified, using the OX_ID or initiator_task_tag. The PPU further verifies if the packet was received in order using sequence numbers or verifying that data offsets are in ascending order. If the packet was not in order, the read command is terminated in error. If the packet is in proper order, however, the VTD ID, Task Index, and FlowID are retrieved from the ETCB and VTD and copied into the local header. The packet is sent to the traffic manager and ultimately the switch fabric.

In the event that a read-data packet crosses an extent boundary, the data offset of the packet from the second extent must be modified. This offset is usually performed on the egress side, described below, as the FlowID will identify the packet from the second extent. In addition, in order to ensure sequentially returned data, the read command to the second extent will not be sent until completion of the read from the first extent.

Read Data Packet—Egress

When a read-data packet is received by an PPU from the switch fabric, the ITCB for the packet is identified, usually using the Task Index in the local header. From the ITCB, the PPU retrieves the initiator_task_tag or OX_ID. Using the saved data in the ITCB, the PPU generates proper iSCSI DataSN or FCP sequence IDs as well as other flags or variables of the PDU or FCP frame header. The local header is updated with the TCP Control Block Index or FCP S_ID from the VTD. Note, however, that for a packet going back to the initiator, the S_ID from the original packet will be used as the D_ID. The outgoing port number is also added to the local header. The packet is then sent to the PACE, which removes the local heade, and forwards the packet to the appropriate port.

Response Packet—Ingress

A response packet will be received from a target device. The ETCB for the packet is then identified, using the initiator_task_tag or OX_ID of the packet. In some embodiments the initiator_task_tag or OX_ID will be the same as the Task Index. If the ETCB is not found, the packet is discarded. However, if the ETCB is found, then the Task Index is copied into the local header of the packet along with the VTD ID and the FlowID. The packet is sent to the traffic manager and ultimately to the switch fabric. Finally, because the response packet signals the completion of a task, the ETCB for the task is released.

Response Packet—Egress

After a response packet has been through the switch fabric, it will be received by an egress PPU. The ITCB for the packet is identified, using the Task Index from the local header. If the ITCB is not found, the packet is discarded. If the ITCB is found, the outstanding command count for the virtual target is decremented in the VTD. The PPU generates the LUN, iSCSI ExpStatSN or FCP sequence ID from information in the ITCB and, if necessary, constructs or updates the proper FCP header. The PPU also constructs other flags and variables for the PDU or FC frame header. The PPU updates the local header with the TCP Control Block Index or FCP S_ID (which becomes the D ID) retrieved from the VTD. The packet is forwarded to the PACE, step 2312, which removes the local header, and forwards the packet to the appropriate port, step 2316. The PPU frees the ITCB,.

Storage Pools

As shown in FIG. 2, in its physical configuration, a system in accordance with an embodiment of the invention includes a switch 204 coupled to one or more servers 202 and to one or more physical devices 206, i.e., storage devices or subsystems. Each physical target is comprised of one or more logical units (LUs) 207. It is from these LUs that virtual targets will ultimately be formed.

However, before a virtual target can be created, or "provisioned," the switch needs to be "aware" of the physical storage devices attached and/or available for access by it as well as the characteristics of those physical storage devices. Accordingly, in one embodiment of the invention, when a storage device or an initiator device is connected to or registered with the switch, the switch must learn about the performance characteristics of the new device. In one embodiment, the switch includes a utility program, which can measure storage access time, data transfer rate, cache support, number of alternate paths to the device, RAID support, and allowable maximum commands for the LUs of the physical device. In some embodiments, once a device is connected to the switch, the utility program will automatically discover the device and automatically gather the required information without any user or other intervention. In some such embodiments, the switch will "discover" the addition/removal of a device when there is a disturbance or reset on the signal lines to the port.

Once the device is "discovered," various inquiries are sent to the device to gather information regarding performance characteristics. For instance, read/write commands can be sent to measure transfer rate or to check access time. Alternatively, in some embodiments, the obtaining of performance characteristics can be done by having an administrator enter the performance characteristics at a management station 210, wherein the characteristics can then be provided to a switch 204.

The switch provides users with the ability to define multiple components of a Quality of Service (QoS) policy. Through a QoS policy, a user can select the conditions of storing and retrieving data for initiators and targets. In one embodiment, a QoS policy is defined by three elements: provisioning a virtual target, provisioning an initiator connection, and defining a user domain. Nonetheless, some embodiments may not require all three elements to define a QoS policy. For instance, some embodiments may only require provisioning a virtual target and provisioning an initiator connection, but not the user domain. Other embodiments may use different elements altogether to define a QoS policy.

Provisioning a Virtual Target

Once the LUs for physical devices are in an accessible pool (i.e., not the "No Pool"), then a virtual target can be created from those LUs. To provision a virtual target, a user will select several characteristics for the virtual target in one embodiment of the invention including:

the size (e.g., in Gigabytes);
a storage pool, although in one embodiment the user may select only from the storage pools which the user is permitted to access;
desired availability, e.g., always available (data is critical and must not ever go down), usually available, etc.;
the WWUI of the virtual target;
a backup pool;
user authentication data;
number of mirrored members;
locations of mirrored numbers (e.g., local or remote).

Still in other embodiments of the invention, different, additional, or fewer characteristics can also be selected.

The switch then analyzes the available resources from the selected pool to determine if the virtual target can be formed, and in particular the switch determines if a number of LUs (or parts of LUs) to meet the size requirement for the virtual target are available. If so, the virtual target is created with one or more extents and a virtual target object is formed in the SCC database identifying the virtual target, its extents, and its characteristics. Examples of user-selected characteristics for four virtual targets are shown in Table 1 below:

TABLE 1

| | Virtual Target | | | |
|---|---|---|---|---|
| Virtual Target | A | B | C | D |
| size | 1 TB | 500 GB | 100 GB | 2 TB |
| storage pool | platinum | gold | bronze | bronze |
| availability | always | always | high | high |
| WWUI | drive A | drive B | drive C | drive D |
| backup pool | tape 1 | tape 2 | tape 3 | tape 4 |
| authentication data | connection ID and password | connection ID and password | password | password |
| # of mirrored members | 3 | 2 | 2 | 1 |
| locations of replicated sites | local | local | remote | none |
| Switching priority (One of 4) (if all else is equal, which target has priority) | 1 | 2 | 3 | 4 |

TABLE 1-continued

| Virtual Target | | | | |
|---|---|---|---|---|
| Virtual Target | A | B | C | D |
| Read Load Balance-on or off-when mirroring chosen | On | Off | Off | Off |
| Type of Media for backup (backup pool) | Fastest | Fast | Medium | Slowest |
| Mirroring-on or off | On | On | Off | Off |
| How many paths to storage from server (used for load balancing) | 2 | 2 | 1 | 1 |
| Path to storage via how many switches | 2 | 2 | 1 | 1 |
| Auto Migration to another target on excessive errors-on or off | Off | Off | On | Off |
| Physical storage-exclusive or shared | Exclusive | Exclusive | Exclusive | Shared |
| Virtual target-exclusive or shared | Exclusive | Exclusive | Shared | Shared |
| VPN on WAN connections | Yes | Yes | No | No |
| IP Precedence (DiffServ, RFC 2474) | Yes | Yes | No | No |
| MTBF | 15 yrs. | 10 yrs. | 5 yrs. | 5 yrs. |

In addition to provisioning a new virtual target, a switch in accordance with an embodiment of the invention can also modify existing virtual targets with new or different information or delete virtual targets when they are no longer needed.

In one embodiment, the QoS policy is generally defined by virtual target (as provisioned), the initiator connection (as provisioned), and the User Domain. Accordingly, referring again to Table 1, above, the first three entries in the table—"ID of Initiator," "ID of Virtual Target" and "ID of User Domain"—will inherently describe the QoS policy since the attributes of the initiator connection and virtual target were defined when these items were provisioned. For example, the minimum and maximum bandwidth for the initiator connection has already been identified (see Tables 2 and 3). The User Domain assists in defining the policy by determining, for example, if the initiator connection or virtual target connection is slower and forcing the QoS to the slower of the two. Of course, as mentioned above, the User Domain may not be necessary in all embodiments. As well, other embodiments may define an SLA using more, fewer, or different parameters than those shown in Table 4 above.

Figure 5:
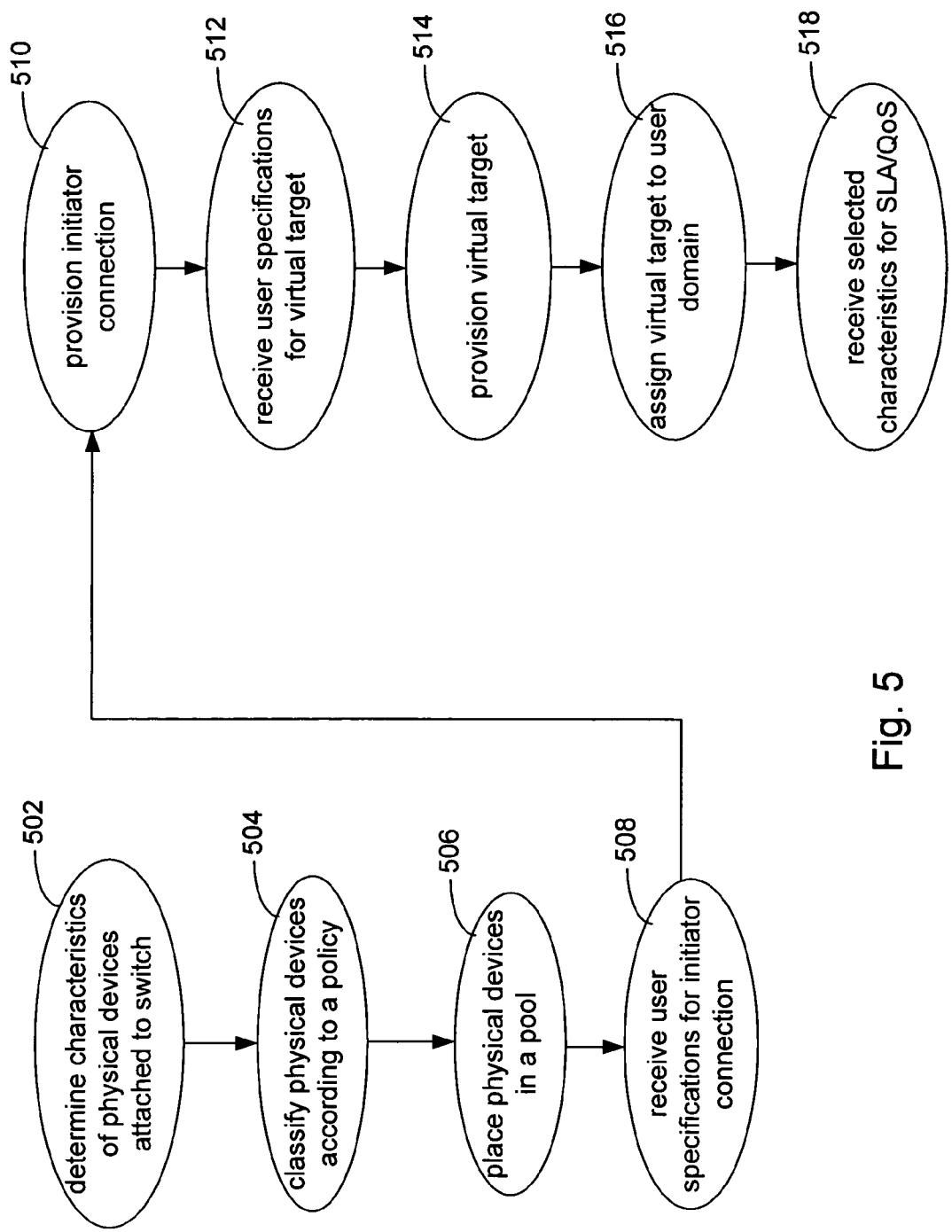
FIG. 5 is a flow diagram illustrating steps in accordance with an embodiment of the invention.

FIG. 5 summarizes the steps to provision the virtual targets and connections in order to be able to provide QoS in one embodiment. As shown, a switch in accordance with an embodiment of the invention discovers and determines the characteristics of physical devices in communication with the switch, step 502. The switch then classifies those devices, step 504, and associates those devices with a particular storage pool, step 504. The switch will receive information for an initiator connection, step 508, and will then provision the connection, step 510, creating an object in the SCC database. The switch will also receive parameters for a virtual target, step 512, and will provision the virtual target in accordance with those parameters, step 514, if the resources are available, creating an object in the SCC database. Note that steps 508-514 can be performed in any order, the order shown in FIG. 5 being exemplary only. After the virtual target is provisioned, a user domain is created and the virtual target placed in the user domain or the virtual target is placed in a pre-existing user domain, step 516. A user could also attempt to access a previously provisioned virtual target (hence, step 514 may not be necessary for every connection). Finally, a switch in accordance with an embodiment of the invention receives SLA/QoS parameters, step 518.

Enforcing Bandwidth Allocation in the Switch

In one embodiment, it is possible to provision each virtual target with a number of virtual logical units, and specify minimum and maximum bandwidth allocations for each logical unit accessed through a single physical port. Where a single initiator writes or reads data to or from two or more virtual logical units through a single physical port on a switch, two or more physical logical units can reply and congest the physical port. FIG. 6a shows an exemplary situation where a single initiator accesses two virtual logical units (VLUs) via a single physical port 250 on switch 204 Each VLU in turn couples to one or more physical logical units (PLUs). While only two VLUs are shown, each communicating with one PLU, it should be understood that the number of VLUs and PLUs may communicate through physical port 250.

Initiator 102 may include two applications, application 1 and application 2, each accessing a respective one of the virtual logical units. Application 1 accesses physical logical unit 206a through virtualized logical unit VLU1, while application 2 accesses physical logical unit 206b through virtualized logical unit VLU2. Each VLU is configured with a minimum and maximum bandwidth by the user as described above. Again, this bandwidth can be configured as a percentage of the available physical port capacity. In accordance with the invention, the user may assign bandwidth parameters of bandwidth management to each logical unit. For example, suppose VLU1 provides access to data which requires a high bandwidth access, while VLU2 provides access to non-critical data and does not require high bandwidth. In this situation, the switch may be configured to guarantee that the low latency data has greater access to the resources of physical port 250 than the non-critical data.

In order to implement this bandwidth control, the system of the present invention monitors the bandwidth used by each VLU and throttles access to each VLU to control the overall bandwidth on the physical port 250. In one embodiment, the system uses a traffic marker to mark the traffic passing from the PLUs through the VLUs through the physical port 250 shown in FIG. 6a. In general, when traffic from physical logical unit (for example PLU2) arrives in a virtual logical unit (in this case VLU2), if the bandwidth is over the maximum allowed bandwidth for the given virtual logical unit, the excess amount of bytes is recorded in the virtual logical unit. Such traffic is allowed to pass to the application, but the overage information is used to throttle the connection to the VLU until the bandwidth drops to set levels. When the initiator issues a new command to VLU2, such as a read command to the physical logic unit, the transfer length in the command will be used to offset (reduce) the previously recorded overage amount. This new command and possibly subsequent commands are rejected until the entire excess amount that the VLU exceeded its share of bandwidth has been offset. In the case of FCP SCSI, for example, commands are rejected with a TASK_SET_FULL status FCP response until the entire excess amount has been offset. If the bandwidth of traffic from the physical logical unit to the virtual logical unit is less than the minimum allowed bandwidth, no excess amount is recorded on the virtual logical unit (in this example, VLU2).

This generalized explanation of the bandwidth balancing algorithm of the present invention will be described in further detail below.

The ability to configure the bandwidth for each VLU gives rise to two bandwidth management configuration scenarios, generally referred to herein as a static scenario and a dynamic scenario. If a user sets the bandwidth of the VLUs so that one VLU is limited to, for example, a very low percentage of the total physical port bandwidth, traffic from the other logical unit will be guaranteed a large percentage of the port bandwidth. In this static scenario, the full resources of the port are not utilized. For example, if the maximum bandwidth of VLU2 is limited to 20% of the port capacity, VLU2 will never exceed 20% of the port capacity even if no traffic is moving through VLU1. Hence, port resources are wasted.

A dynamic scenario exists when each VLU is configured with a minimum and maximum bandwidth and the aggregate of all maximum bandwidths of all VLUSs accessed by the port exceeds 100% of the physical port capacity. In this dynamic scenario, if both VLUs could receive traffic at their maximum allowable bandwidths, the port capacity at port 250 will be exceeded, and the system must throttle the traffic from the respective PLUs. Suppose that VLU1 has a minimum bandwidth of 70% and a maximum bandwidth of 100%, and VLU2 has a minimum bandwidth of 10% and maximum bandwidth of a 100%. Because VLU1 has a minimum bandwidth of 70%, it is desirable that any balancing favor VLU1.

In accordance with the invention, traffic at each VLU is monitored and marked, and traffic through the VLUs throttled by rejecting commands from the initiator to the VLU at port 250 until bandwidth though one of the VLUs drops below set levels.

The general method of the present invention is illustrated in FIG. 7a. As shown therein, at step 702, traffic at the physical port is monitored to determine whether the port is congested. At step 704, if traffic is congested, traffic is throttled at step 706 by rejecting commands to respective VLUs communicating through port 250 to prevent congestion and prioritize access through the port based on the bandwidth configuration. This continues until traffic congestion on the port is not detected.

FIG. 7b shows one implementation of the throttling step 706. As shown therein, the bandwidth (usually expressed in bits per second (bps) or bytes per second) of traffic returning from each PLU to the storage switch is monitored at step 710 as it arrives at the VLU. Next, a series of throttle control determination steps 705 is performed to determine whether the bandwidth on each VLU arriving from the PLU exceeds an allowable maximum. If so, this fact is used to throttle down traffic from the PLU or PLUs communicating with the VLU. If the bandwidth of traffic arriving at the VLU is less than allowed, the data is simply transmitted to the initiator. If the bandwidth exceeds the maximum bandwidth for the VLU, at step 720, any excess amount is recorded at step 730 in the VLU by the PPU. The traffic is allowed to pass to the initiator at step 730 and the command is forwarded to the PLU at step 765.

At step 750, upon receiving the next command for the offending VLU, the system will determine at step 760 that the VLU has exceeded its bandwidth and the port will reject the command at step 770 and reduce the bandwidth by the amount of data requested in the command. For example, if VLU1 is allocated a bandwidth of 300 Mbytes/s and traffic at step 710 is determined to be 330 Mbytes/s, then at step 730, the excess amount of bytes (30 Mbytes/s multiplied by time) which are read during the offending period recorded at step 730. When a subsequent read command for VLU1 is received at step 750, the command will be rejected, (step 760 will be true) but the amount of bytes requested in the read will be deducted from the excess at step 770. This rejection and decrementing will occur until VLU1 no longer owes bandwidth at step 760, when the next command will be forwarded to the PLU at step 765.

As explained in further detail below, in order to allow for any configuration of minimum and maximum bandwidth settings, a weighting scheme is utilized to determine which VLU to throttle at a given time. In addition, because a minimum and maximum bandwidth must be factored into the weighting process, a two rate, three color marker (trTCM) system is used to meter the traffic through each VLU.

Figure 6B:
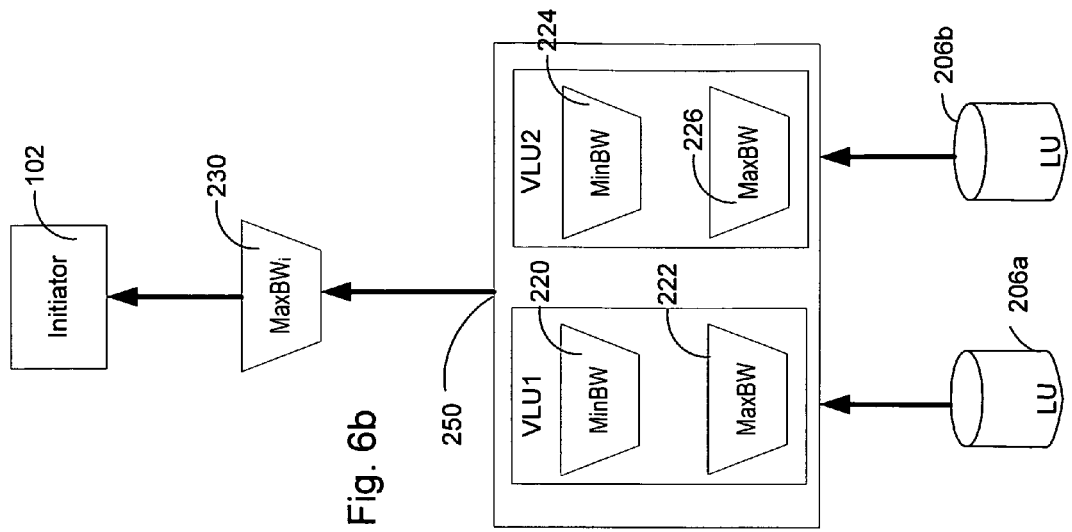
FIG. 6b is a functional block diagram similar to FIG. 6A illustrating the metering system of the present invention.
Figure 6A:
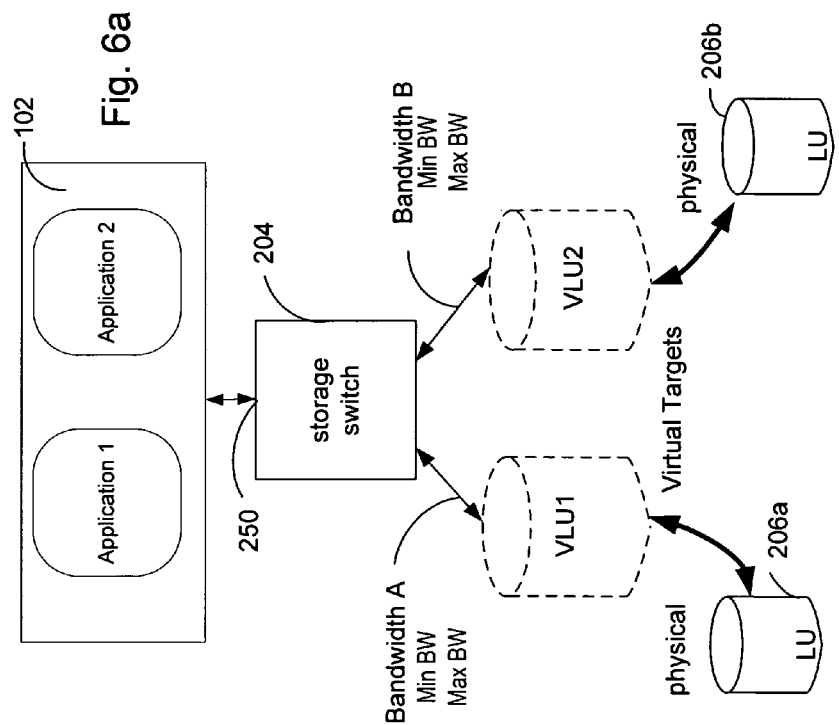
FIG. 6A is a block diagram illustrating a storage area network with multiple virtual logical units communicating with an initiator via a single physical port on the storage switch.
Figure 8:
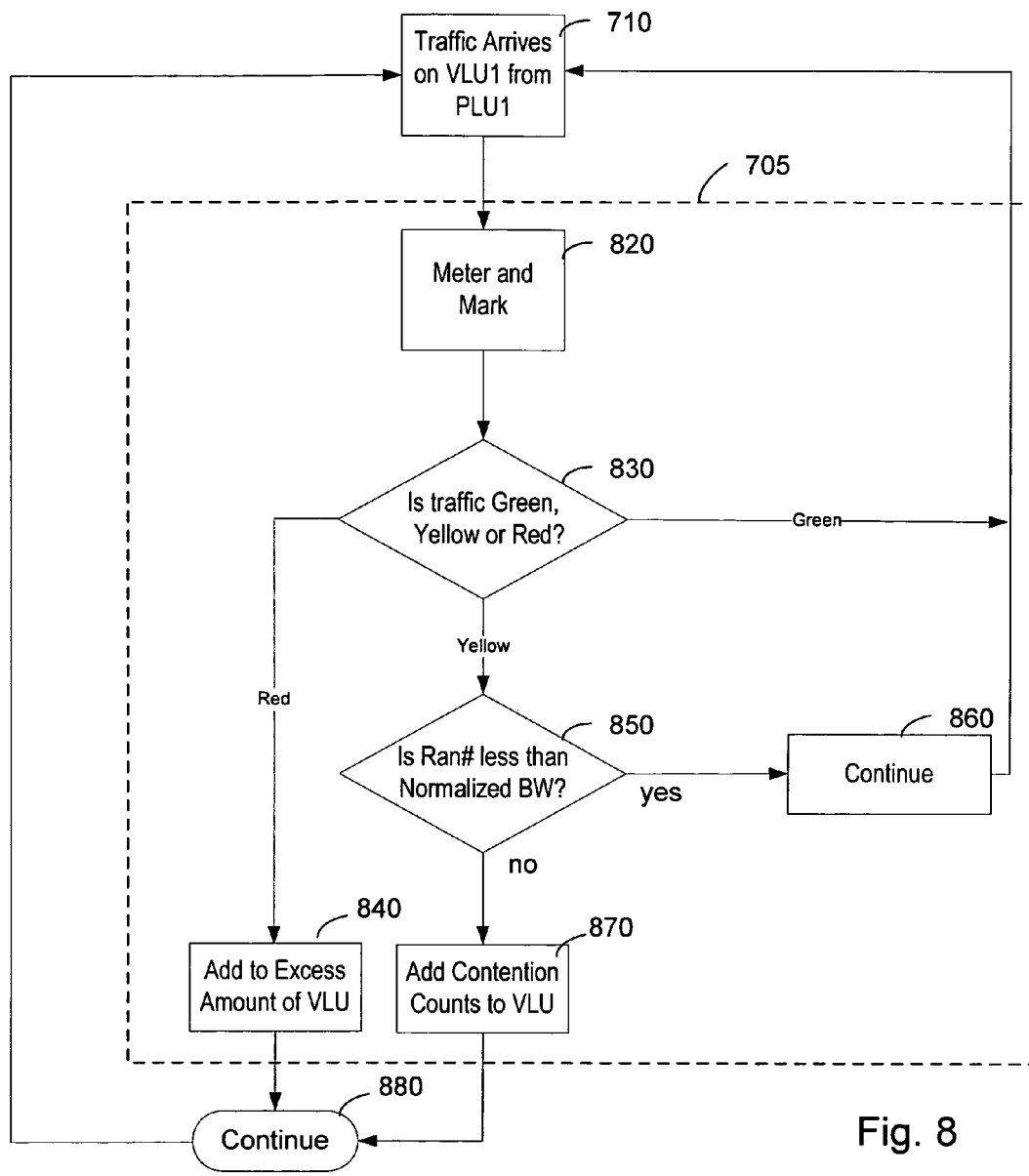
FIG. 8 is a flow chart illustrating a second embodiment including a specific method for determining throttle control in the system of the present invention.

FIG. 6b illustrates the concept of a two rate three color marking system using two buckets per VLU to meter and mark traffic at each VLU. FIG. 8 illustrates the weighting system of the present invention using this trTCM marking.

The weighting system uses the concept of contention counts to balance both the minimum and maximum bandwidth settings for the VLU. In general, instead of collecting and measuring actual bytes of traffic, contention counts are generated based on traffic color and a comparison of the maximum bandwidth allowed at the VLU to a random number. The smallest contention counts of all the VLUs on the same switch port 250 are used to determine the VLU's excess amount. Then this VLU's contention count is decreased by the excess amount.

To determine contention counts, the trTCM marker meters a packet stream and marks frames either green, yellow or red. The packet is marked red if it exceeds a peak information rate, in this case, a maximum bandwidth. Otherwise it is marked either yellow or green depending on whether it exceeds or does not exceed a committed information rate, in this case, the minimum bandwidth. The meter meters each packet and passes the packet and the metering result to the marker. In the SSC, the PPU performs the metering and marking function, as well as the throttling of commands at port 250. Contention counts are maintained in the VTD for each VLU. In general, trTCM is configured by setting values to four traffic parameters, in this case, the maximum bandwidth MaxBW and its associated peak burst size, and the minimum bandwidth MinBW and its associated peak burst size. The burst sizes are measured in bytes.

As illustrated in FIG. 6b, the meter is specified in terms of two token buckets 220, 222, 224, and 226 per stream. One bucket (such as buckets 220, 224) is configured for the minimum bandwidth and one bucket (such as buckets 222, 226) is configured for the maximum bandwidth. In one implementation of trTCM, the maximum size of the token bucket MaxBW is the maximum burst size and the maximum size of the token bucket for the MinBW is its burst size. The token buckets are initially set full and the token count equal to the respective burst sizes. Thereafter, the token count is incremented by one maximum bandwidth rate per second up to the maximum burst size and the token count for the minimum bandwidth bucket is incremented by the minimum bandwidth times per second up to the minimum burst size. In this configuration, the low-rate token bucket is configured for the minimum bandwidth and the high-rate token bucket is configured for the maximum bandwidth. The traffic that flows through both token buckets is marked green and is, therefore, protected. The traffic that flows through the high-rate token bucket, but not the low-rate token bucket, is marked yellow and is used to determine contention counts. Hence, traffic that does not flow through either token bucket is marked red. This amount is recorded and used to generate contention counts which are used to throttle subsequent traffic. More specifically, when the packet of size B bytes arrives at time T, if the token count in the maximum bandwidth bucket minus the size of the packet, is less than zero, the packet is marked red. If the token count in the minimum bandwidth bucket less the size of the packet is less than zero, the packet is marked yellow and the maximum bandwidth bucket is decremented by B bytes, otherwise the packet is green and both the minimum bandwidth and maximum bandwidth bucket are decremented by B bytes. It should be recognized that alternative configurations of this marking scheme may be utilized and this description is exemplary of only one embodiment. In addition, other marking schemes monitoring two rates relative to a maximum information rate may be utilized.

FIG. 8 details the one embodiment for implementing the throttle control and bandwidth measurement steps 705 of FIG. 7. At step 820, after traffic arrives in the VLU from PLU1 at step 710, the traffic burst size read, and the traffic metered and marked in accordance with trTCM.

In the example where both bandwidths are set to 100%, there will be no red traffic. If, for example, one of the two VLUs has a maximum bandwidth less than 100%, some of the traffic will be marked red For the VLU with a higher minimum bandwidth, fewer packets will be marked yellow. Hence, in the example above where VLU1 provides access to low latency data, and is set with a MinBW of 70% and a MaxBW of 100% of the capacity of the physical port, and VLU2 with MaxBW=100% and MinBW=10%, VLU2 will give rise to a larger number of yellow marked frames. As noted below, only yellow packets affect the contention counts and hence the priority weight assigned to a particular port.

Next, at step 830, a determination is made as to whether the traffic is red, green or yellow. If the traffic is green at step 830, no action on the packet is taken. If the traffic is marked yellow at step 830, then at step 850, a classification of whether or not the traffic is a contention count is made. At step 850, the maximum bandwidth sending value for the VLU is normalized to an 8-bit value. Next, a random 8-bit value is generated for each frame in the stream. This random 8-bit value is compared to the normalized maximum bandwidth value. If the random number is more than the normalized maximum bandwidth value, the yellow frame is considered a contention frame. At step 870, the system adds contentions counts to the VLUs record. Specifically, the contention counts for the VLU are incremented by the size of the frame in step 870. This way, the higher the maximum bandwidth setting is, the less contention counts are added at step 870. Likewise, the higher the minimum bandwidth is, the fewer yellow frames will occur, and hence the fewer contention counts. This provides the VLU with the higher minimum and maximum bandwidth settings less occurrences of being throttled. If the traffic is red at step 830, it is automatically added to the excess amount for the VLU at step 840.

An additional measurement bucket is provided at the physical port 250 in FIG. 6B. This token bucket measures the aggregate traffic of all VLUs accessing the physical port. A single rate token bucket is utilized to measure bandwidth control. When the aggregate traffic exceeds the physical port capacity, the VLU with the largest number of contention counts is selected for throttling.

Tables 2-6 explain one implementation of implementing steps 760 and 770 to determine which VLU has an excess amount of contention counts, and hence, which VLU to throttle in step 770.

Table 2 shows an exemplary number of contention counts for initiators VLU1 and VLU2:

TABLE 2

| Initiator | Contention Counts | Excess Amount |
|---|---|---|
| VLU1 | 60 | 0 |
| VLU2 | 300 | 0 |

In Table 2, VLU2 has a higher number of contention counts than VLU1. Hence, VLU2 will be throttled by the size of the request data until its contention counts drop below VLU1. The smallest contention counts of all VLUs on the same port are used to add to the VLU's excess amount. Then this VLU's contention count is decreased by this excess amount. For example, suppose the aggregate bandwidth is over the port capacity and, as in Table 2, VLU1 has 60 contention counts and the traffic on VLU2 has 300 contention counts. When the single rate bucket determines that the port is congested, the excess amount will be the smallest contention count of all VLUs on the same port, which in table 2 is 60. Hence, the count state will be as shown in Table 3:

TABLE 3

| Initiator | Contention Counts | Excess Amount |
|---|---|---|
| VLU1 | 60 | 0 |
| VLU2 | 240 | 60 |

When a next command is received at step 750, VLU2's command will be rejected, and the excess amount reduced by the size of the request in the command. Suppose, for example, the command is a read command and the read command was for 40 bytes, the resulting excess amount for VLU2 would be reduced by 40, as shown in Table 4:

TABLE 4

| Initiator | Contention Counts | Excess Amount |
|---|---|---|
| A | 25 | 0 |
| B | 240 | 20 |

The excess amount will continue to be offset by subsequent commands until it becomes zero or negative, as shown in Table 5:

TABLE 5

| Initiator | Contention Counts | Excess Amount |
|---|---|---|
| A | 25 | 0 |
| B | 240 | 0 or less |

If, after the traffic is throttled, the aggregate bandwidth is less than the port capacity, then the contention count conversion to excess amount need not be performed. However, contention counts can age over time. Over time, the contention counts gradually decrease to zero if there is no congestion, in accordance with the principles of the trTCM algorithm. Table 6 shows the state in the non-congesting period:

TABLE 6

| Initiator | Contention Counts | Excess Amount |
|---|---|---|
| A | 0 | 0 |
| B | 0 | 0 or less |

As long as congestion remains on the port 250, as detailed at steps 760, and 770, the current contention counts are used in the algorithm. It should be understood that the aforementioned numbers of "counts" and bandwidth are exemplary only. If congestion occurs again, the cycle in tables 2-6 is repeated.

The foregoing detailed description of the invention has been presented for purposes of illustration and description. The invention is not limited to the example case. It applies to not only FCP and iSCSI read but also FCP and iSCSI writes. The congested port can be either a port connected to an initiator or a port connector to a target. Traffic could be from the initiator to the target or from the target to the initiator, since traffic can be monitored at the ingress port or the egress port. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for use in a system for storing and accessing data, the system including at least one initiator, at least two targets, and at least one switch having a port, the method comprising:
   determining whether congestion occurs at the physical port; and
   controlling bandwidth usage by each of at least two targets based on minimum and maximum bandwidth settings for each of the targets, wherein the step of controlling comprises monitoring traffic passing from each of the two targets to the port, and recording a data amount when either of the two targets exceeds a maximum bandwidth.

2. The method of claim 1 wherein the step of monitoring comprises incrementing the data amount by an amount of data read during an excess bandwidth period.

3. The method of claim 1 wherein the step of monitoring comprises decrementing the data amount when a command received for a target with a recorded excess data amount is rejected.

4. A method for use in a system for storing and accessing data, the system including at least one initiator, at least two targets, and at least one switch having a port, the method comprising:
   determining whether congestion occurs at the physical port; and
   controlling bandwidth usage by each of at least two targets based on minimum and maximum bandwidth settings for each of the targets, wherein said step of controlling comprises assigning a weight to each target when traffic from the target to the port exceeds an allowable maximum bandwidth for the target and rejecting commands to one of said two targets.

5. The method of claim 4 wherein the step of assigning a weight includes recording a bandwidth overage amount in a record associated with the target.

6. The method of claim 5 wherein the step of recording a bandwidth overage includes recording a number of bytes.

7. The method of claim 5 wherein the step of rejecting additional commands includes the step of determining a requested number of bytes from the command, and reducing the recorded bandwidth overage by the requested number of bytes.

8. The method of claim 5 wherein the step of assigning a weight includes marking traffic from the target to the port based on a two rate marker.

9. The method of claim 8 wherein the step of assigning a weight include marking the traffic using a two rate, three color marking system.

10. The method of claim 9 wherein the step of weighting includes recording all red marked traffic as a bandwidth overage.

11. The method of claim 5 wherein the step of weighting includes recording all yellow traffic as a bandwidth overage if a comparison of a normalized value of the maximum bandwidth exceeds a random number.

12. The method of claim 11 wherein the overage recorded is a frame size of the yellow traffic frame.

13. The method of claim 11 wherein commands directed to one of said at least two targets with a greater bandwidth overage are rejected until its overage is less than an overage of the other of said at least two targets.

14. A storage switch having at least one physical port providing access to at least two targets, comprising:
   load balancing circuitry affiliated with the port including a memory storing a record of each target, the record including a minimum and maximum bandwidth allocation for the target; and
   processing circuitry affiliated with the port including a bandwidth monitor for each of said at least two targets, the processing circuitry maintaining a weighted record of bandwidth used by each target and rejecting additional commands to at least one target based on the record if the physical port is congested.

15. The switch of claim 14 wherein each target includes at least one virtual target communicating with at least one respective physical logical unit.

16. The switch of claim 14 wherein the processing circuitry includes a command rejecter for commands from the initiator to the virtual target responsive to the weighted record.

17. A method for monitoring bandwidth in a storage switch, the switching including at least one physical port coupling at least one target and at least one initiator via the physical port, comprising:
   determining whether congestion occurs on the physical port;
   assigning a weight to bandwidth usage between the initiator and the target based on minimum and maximum bandwidth settings for each target, wherein said assigning a weight includes determining a smallest overage amount of all targets and adding the smallest overage amount as an excess amount.

18. The method of claim 17 wherein the bandwidth usage is the result of a read command.

19. The method of claim 17 wherein the bandwidth usage is the result of a write command.

20. A method for monitoring bandwidth in a storage switch, the switching including at least one physical port coupling at least one target and at least one initiator via the physical port, comprising:
   determining whether congestion occurs on the physical port;
   assigning a weight to bandwidth usage between the initiator and the target based on minimum and maximum bandwidth settings for each target, wherein the step of assigning a weight includes the steps of monitoring bandwidth from the target using a two rate, three color marker.

21. The method of claim 20 wherein the step of assigning a weight includes recording all red marked traffic as a bandwidth overage.

22. The method of claim 20 wherein the step of assigning a weight includes recording all yellow traffic as a bandwidth overage if a comparison of a normalized value of the maximum bandwidth exceeds a random number.

23. The method of claim 22 wherein the overage recorded is a frame size.

24. The method of claim 22 wherein commands directed to one of said at least two targets with a greater bandwidth overage are rejected until its overage is less than an overage of the other of said at least two targets.

* * * * *